US012096169B2

(12) United States Patent
Sheen

(10) Patent No.: US 12,096,169 B2
(45) Date of Patent: Sep. 17, 2024

(54) AUDIO DEVICE TRANSDUCER AND ASSOCIATED SYSTEMS AND METHODS

(71) Applicant: Sonos, Inc., Santa Barbara, CA (US)

(72) Inventor: Timothy Sheen, Brighton, MA (US)

(73) Assignee: Sonos, Inc., Santa Barbara, CA (US)

( * ) Notice: Subject to any disclaimer, the term of this patent is extended or adjusted under 35 U.S.C. 154(b) by 204 days.

(21) Appl. No.: 17/756,760

(22) PCT Filed: Dec. 7, 2020

(86) PCT No.: PCT/US2020/070871

§ 371 (c)(1),
(2) Date: Jun. 1, 2022

(87) PCT Pub. No.: WO2021/119655

PCT Pub. Date: Jun. 17, 2021

(65) Prior Publication Data

US 2023/0007376 A1 Jan. 5, 2023

Related U.S. Application Data

(60) Provisional application No. 62/947,114, filed on Dec. 12, 2019.

(51) Int. Cl.
*H04R 1/06* (2006.01)
*H04R 3/00* (2006.01)
(Continued)

(52) U.S. Cl.
CPC ................. *H04R 1/06* (2013.01); *H04R 3/00* (2013.01); *H04R 9/025* (2013.01); *H04R 9/046* (2013.01);
(Continued)

(58) Field of Classification Search
None
See application file for complete search history.

(56) References Cited

U.S. PATENT DOCUMENTS 5,440,644 A 8/1995 Farinelli et al.
5,682,436 A * 10/1997 Sakamoto ................ H04R 1/06 381/408

(Continued)

FOREIGN PATENT DOCUMENTS

EP 1389853 A1 2/2004
JP S57101496 A 6/1982

(Continued)

OTHER PUBLICATIONS

Murakami, "Dynamic Type Speaker". JPS57101496. English translation by EPO. 3 pages. (Year: 1980).*

(Continued)

*Primary Examiner* — Qin Zhu
(74) *Attorney, Agent, or Firm* — Fortem IP LLP

(57) ABSTRACT

Audio device transducers are disclosed herein. In some embodiments, the audio device transducer comprises a coil, first and second terminals each disposed adjacent a first side of the coil, and first and second conductors each electrically coupled to the coil. The first conductor extends from the first end of the coil to the first terminal, and the second end extends from a second end of the coil to the second terminal. The second conductor includes a first conductive pathway and a second conductive pathway spaced apart from the first conductive pathway such that the coil is disposed between the first conductive pathway and the second conductive pathway. In some embodiments, the first conductive pathway is symmetric to the second conductive pathway about an axis extending through the coil.

20 Claims, 10 Drawing Sheets

(51) Int. Cl.
*H04R 9/02* (2006.01)
*H04R 9/04* (2006.01)
*H04R 9/06* (2006.01)

(52) U.S. Cl.
CPC ......... *H04R 9/06* (2013.01); *H04R 2201/028* (2013.01); *H04R 2209/022* (2013.01)

(56) References Cited

U.S. PATENT DOCUMENTS

| | | | |
|---|---|---|---|
| 5,761,320 A | 6/1998 | Farinelli et al. | |
| 5,923,902 A | 7/1999 | Inagaki | |
| 6,032,202 A | 2/2000 | Lea et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,942,252 B2 | 1/2015 | Balassanian et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty, Jr. | |
| 2004/0024478 A1 | 2/2004 | Hans et al. | |
| 2007/0142944 A1 | 6/2007 | Goldberg et al. | |
| 2011/0116657 A1* | 5/2011 | Huang ..................... | H04R 3/00 381/116 |
| 2018/0124499 A1 | 5/2018 | Li et al. | |

FOREIGN PATENT DOCUMENTS

| | | |
|---|---|---|
| JP | 2001313996 A | 11/2001 |
| JP | 2015126463 A | 7/2015 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Preliminary Report on Patentability, mailed on Jun. 23, 2022, issued in connection with International Application No. PCT/US2020/070871, filed on Dec. 7, 2020, 8 pages.
International Searching Authority, International Search Report and Written Opinion mailed on Mar. 11, 2021, issued in connection with International Application No. PCT/US2020/070871, filed on Dec. 7, 2020, 9 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M Holdings* (No. 14-1330-RGA), Di 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

AUDIO DEVICE TRANSDUCER AND ASSOCIATED SYSTEMS AND METHODS

CROSS-REFERENCE TO RELATED APPLICATION

The present application is a 371 U.S. national phase application of International Application No. PCT/US2020/070871, filed Dec. 7, 2020, which claims priority to U.S. Patent Application No. 62/947,114, filed Dec. 12, 2019, the disclosures of which are incorporated herein by reference in their entireties.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, embodiments, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
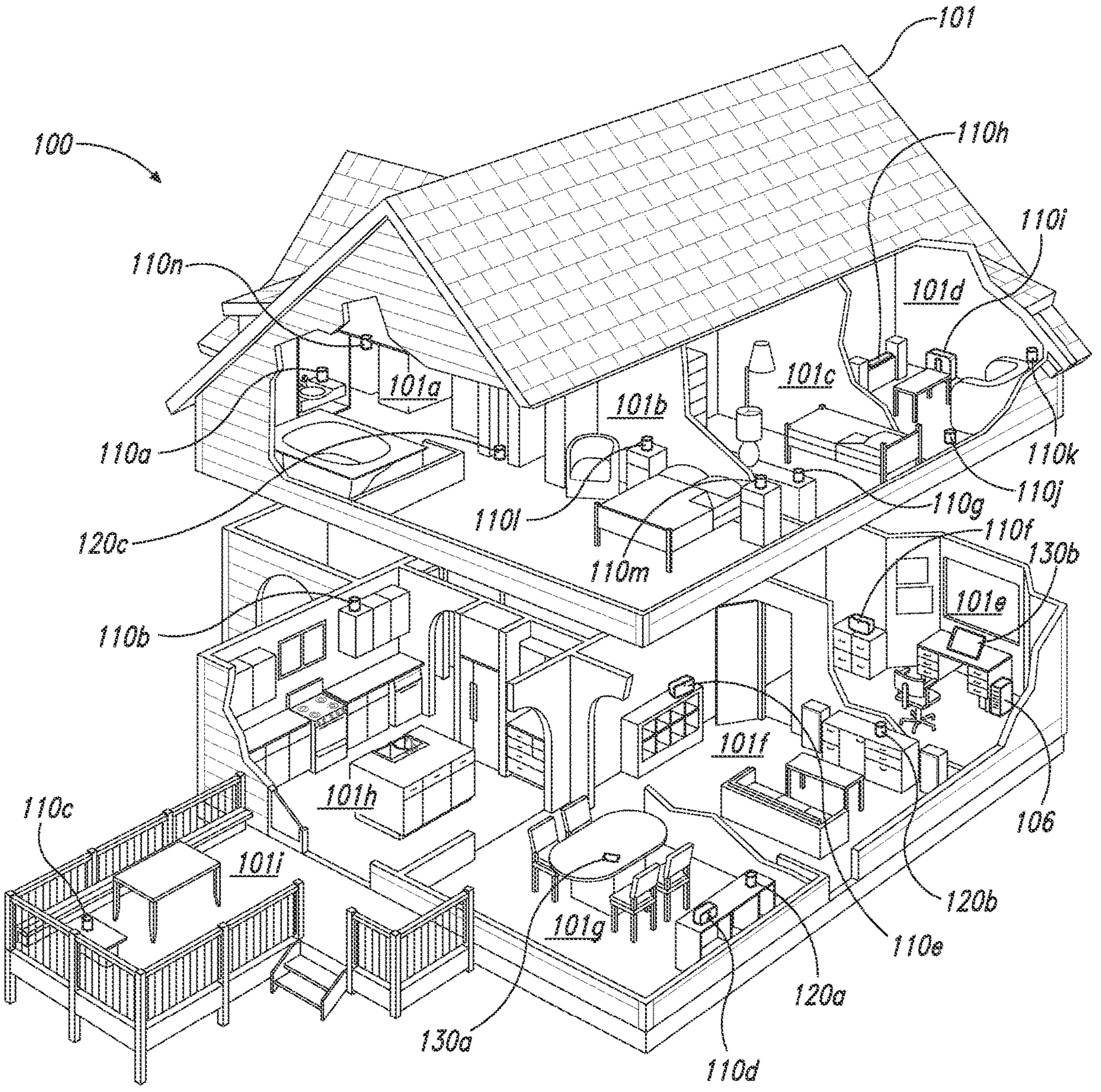
FIG. 1A is a partial cutaway view of an environment having a media playback system configured in accordance with embodiments of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Most transducers used within speakers or audio devices include standard components, such as an input source (e.g., from an amplifier), first and second terminals connected to the input source, and a voice coil connected to the first and second terminals via respective first and second leads. Electrical signals provided from the input source to the voice coil generate a magnetic field, thereby causing the voice coil to move and displace a diaphragm attached thereto to produce audible sound. Despite this intended effect, transducers often have deficiencies that generate undesirable noise or electromagnetic interference (EMI) signals, which can thereby make the listener's experience less than optimal and/or result in undesirable levels of electromagnetic radiation. For example, in traditional transducers, the first lead connected to the first terminal extends from a first side of the voice coil, and the second lead connected to the second terminal extends from a second, opposing side of the voice coil. Disposing the first and second ends of the voice coil on opposing sides is preferred for balance purposes, e.g., to ensure the voice coil is not tilted or askew and thereby does not generate undesirable noise. Additionally, the first and second terminals are preferably disposed adjacent one another, e.g., on the same side of the voice coil, as increasing the distance between the first and second terminals may also generate undesirable EMI. In such a configuration, the first lead extends from the first side of the voice coil to the first terminal, and the second lead extends from the second, opposing side of the voice coil to the second terminal, which is adjacent the first terminal. Due to the second lead extending from the second side of the voice coil to the second terminal along one, and only one, side of the voice coil, the second lead in operation can introduce EMI, which is generally undesired for any transducer or corresponding device. For some devices, such EMI can be filtered downstream, e.g., via a filter incorporated with the amplifier. However, as the footprint of devices continues to decrease to meet consumer demand, the ability to include downstream filters or shielding has become more difficult for manufacturers. Additionally, as a result of less downstream filtering or shielding, complying with relevant national, regional and/or international standards for electromagnetic radiation has also become more difficult.

Embodiments of the disclosed technology address at least some of the above described issues associated with transducers, and generally relate to improved transducers, e.g., for use in audio devices. As explained in more detail elsewhere herein, some embodiments of the disclosed technology relate to a transducer or audio device that includes a voice coil, first and second terminals disposed adjacent a first side of the voice coil, a first conductor extending from the first side of the voice coil to the first terminal, and a second conductor extending from a second, opposing side of the voice coil to the second terminal via first and second conductive pathways. The first and second conductive pathways can extend toward the second terminal along opposing sides of the voice coil in a manner that produces little or no net EMI from the corresponding conductors.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various embodiments of the disclosure are described in greater detail below.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some embodiments, a single playback zone may include multiple rooms or spaces. In certain embodiments, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some embodiments, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some embodiments, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
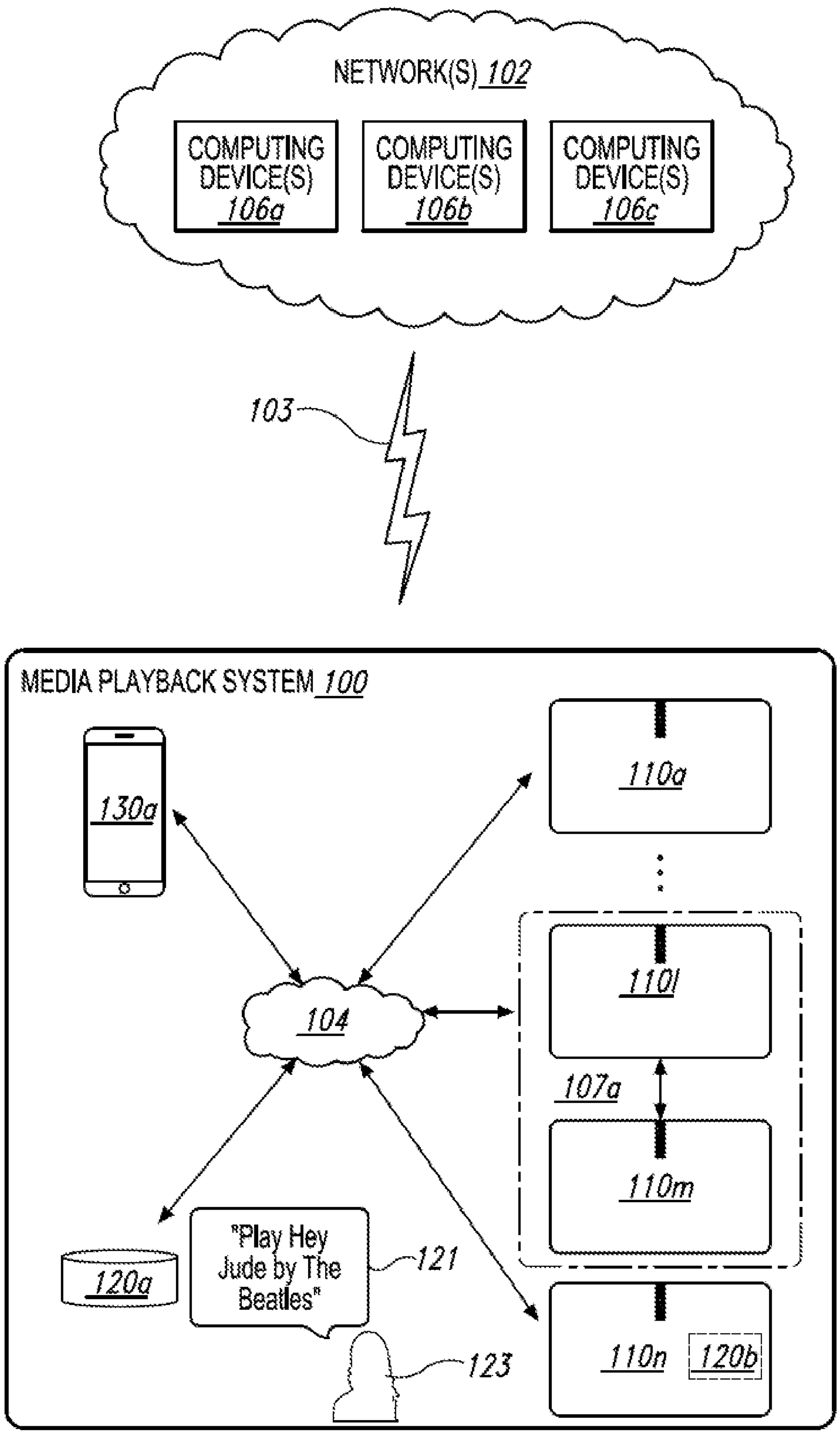
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11 ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some embodiments, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some embodiments, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
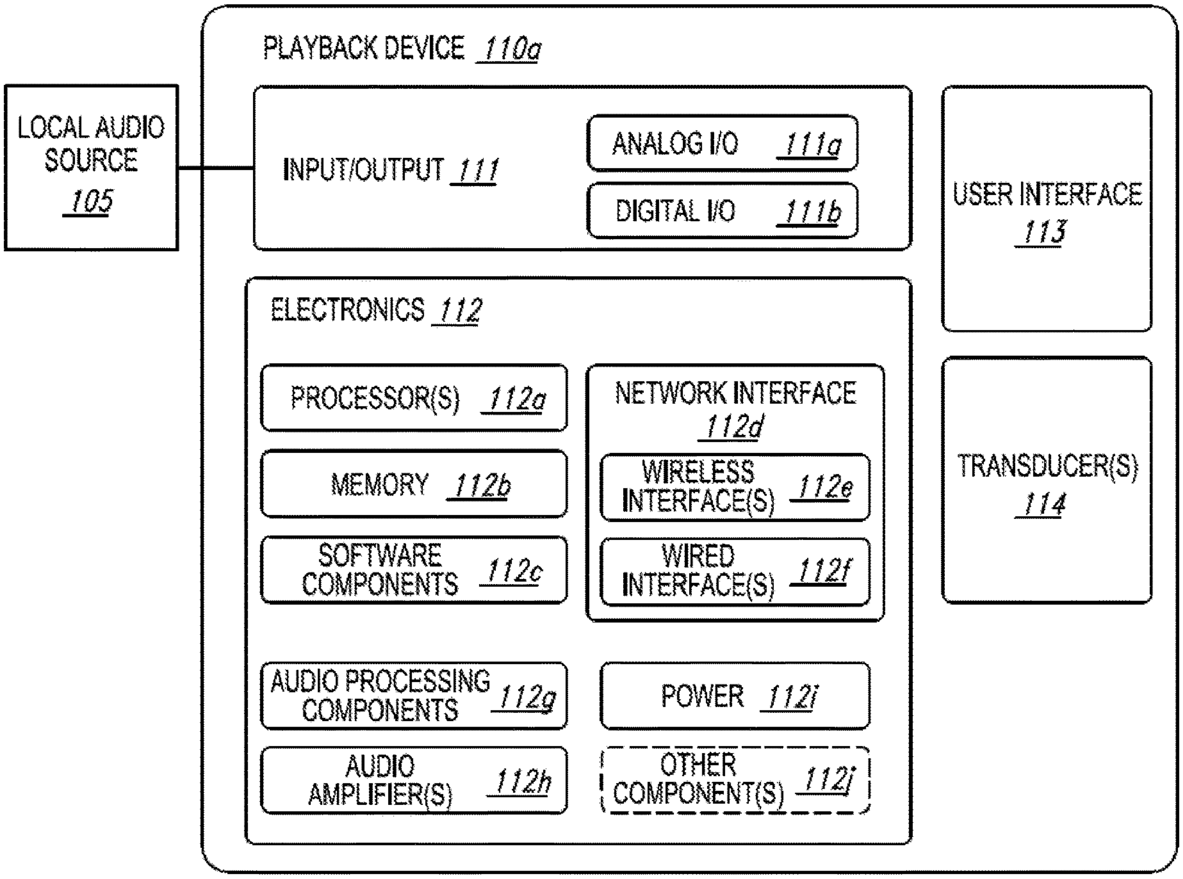
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some embodiments, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components

**112*j*** (e.g., one or more sensors, video displays, touchscreens, battery charging bases).

The processors **112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110** to enable a multi-channel audio environment (e.g., a stereo pair, a bonded zone).

The processors **112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110**. Additional details regarding audio playback synchronization among playback devices can be found, for example, in U.S. Pat. No. 8,234,395, which was incorporated by reference above.

In some embodiments, the memory **112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some embodiments, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100**.

The network interface **112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a***.

In the illustrated embodiment of FIG. 1C, the network interface **112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111**).

The audio components **112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some embodiments, for example, the processors 112*a* execute instructions stored on the memory 112*b*** to perform audio processing operations to produce the output audio signals.

The amplifiers **112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h***.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
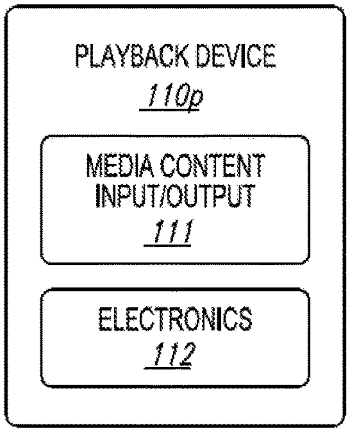
FIG. 1D is a block diagram of a playback device.

By way of illustration, SONOS, Inc. presently offers (or has offered) for sale certain playback devices including, for example, a "SONOS ONE," "MOVE," "PLAY:5," "BEAM," "PLAYBAR," "PLAYBASE," "PORT," "BOOST," "AMP," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
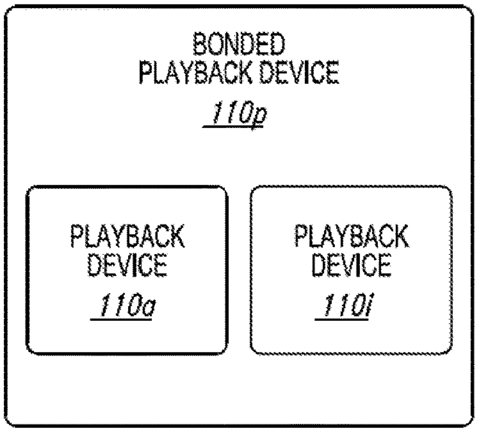
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some embodiments, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device. Additional playback device embodiments are described in further detail below with respect to FIGS. 2A-2C.

c. Suitable Network Microphone Devices (NMDs)

Figure 1F:
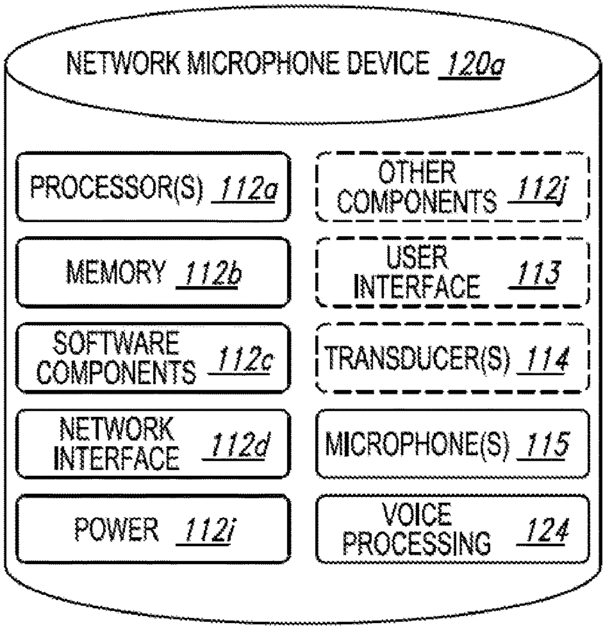
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing components 124, and only a portion of the components of the electronics 112 described above with respect to FIG. 1B. In some embodiments, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

Figure 1G:
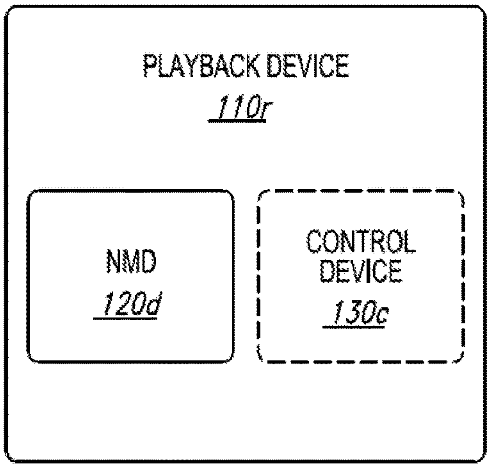
FIG. 1G is a block diagram of a playback device.

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
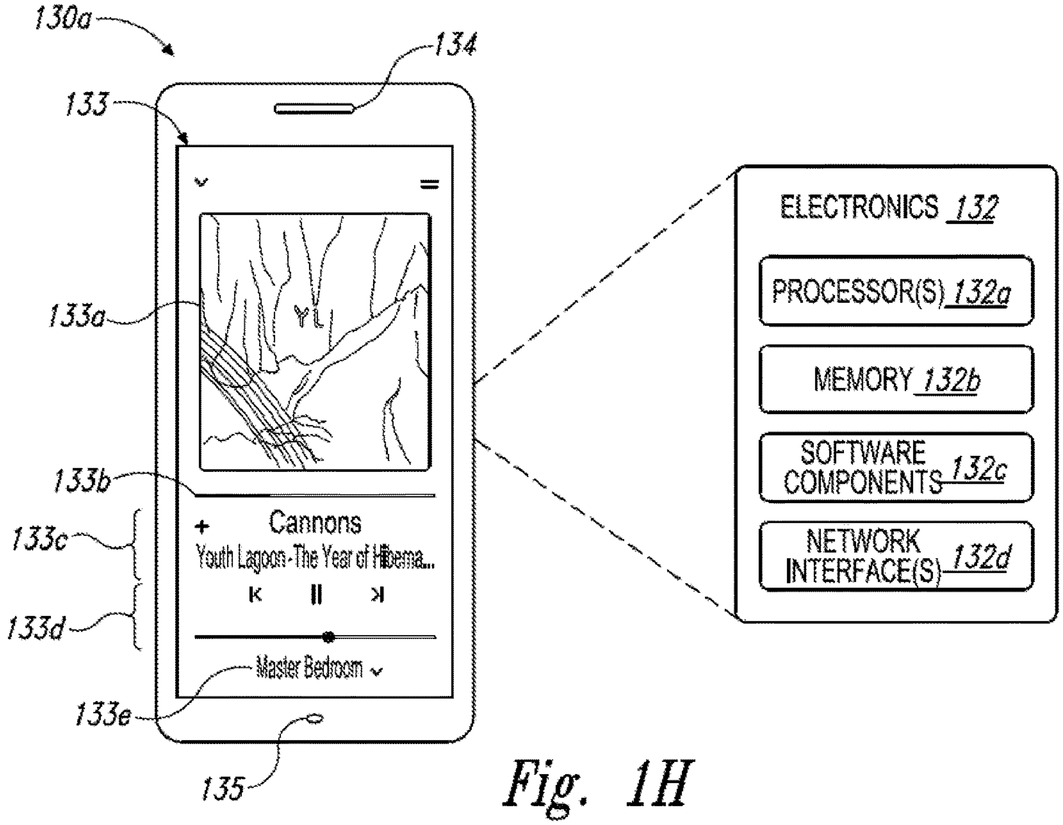
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130 to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133a (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some embodiments, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Example Systems and Devices

Figure 2A:
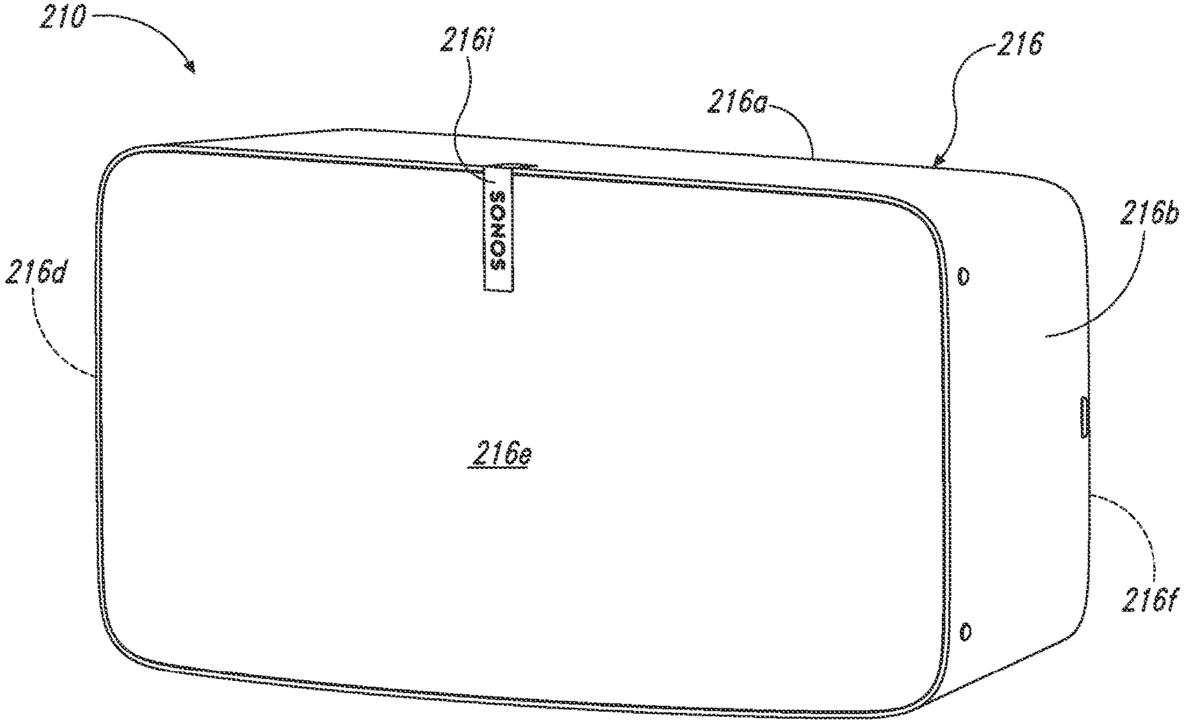
FIG. 2A is a front isometric view of a playback device configured in accordance with embodiments of the disclosed technology.
Figure 2B:
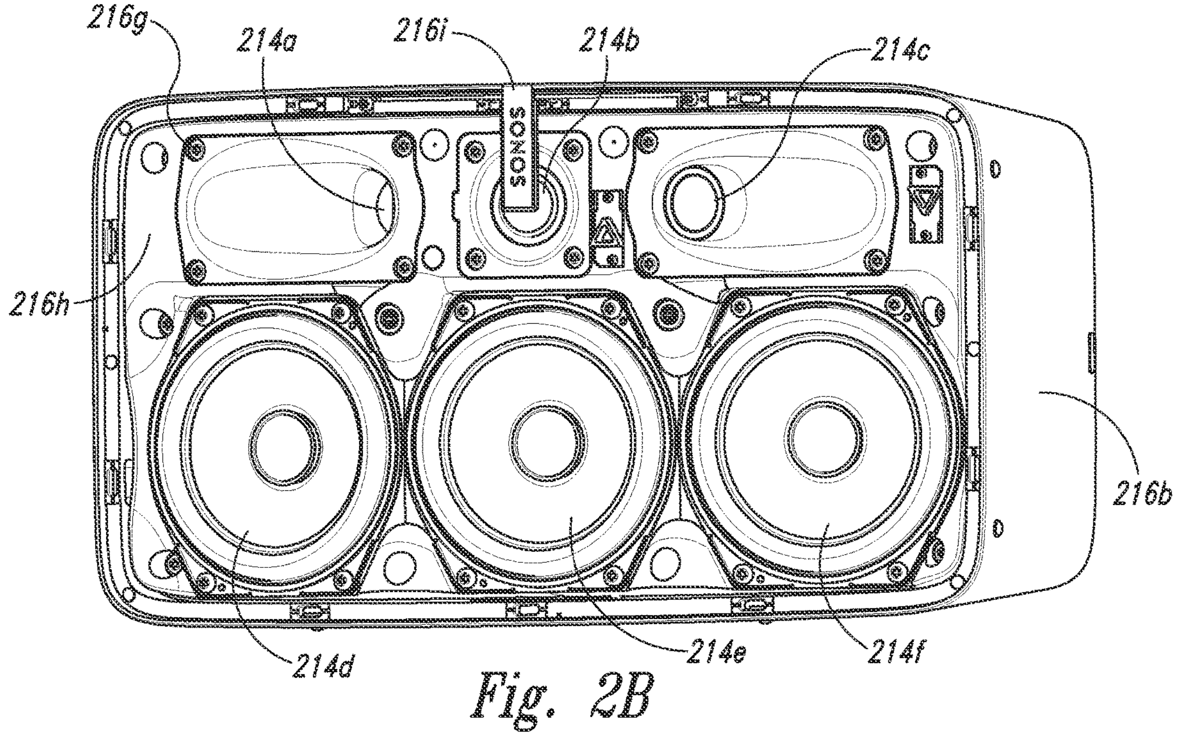
FIG. 2B is a front isometric view of the playback device of FIG. 3A without a grille.
Figure 2C:
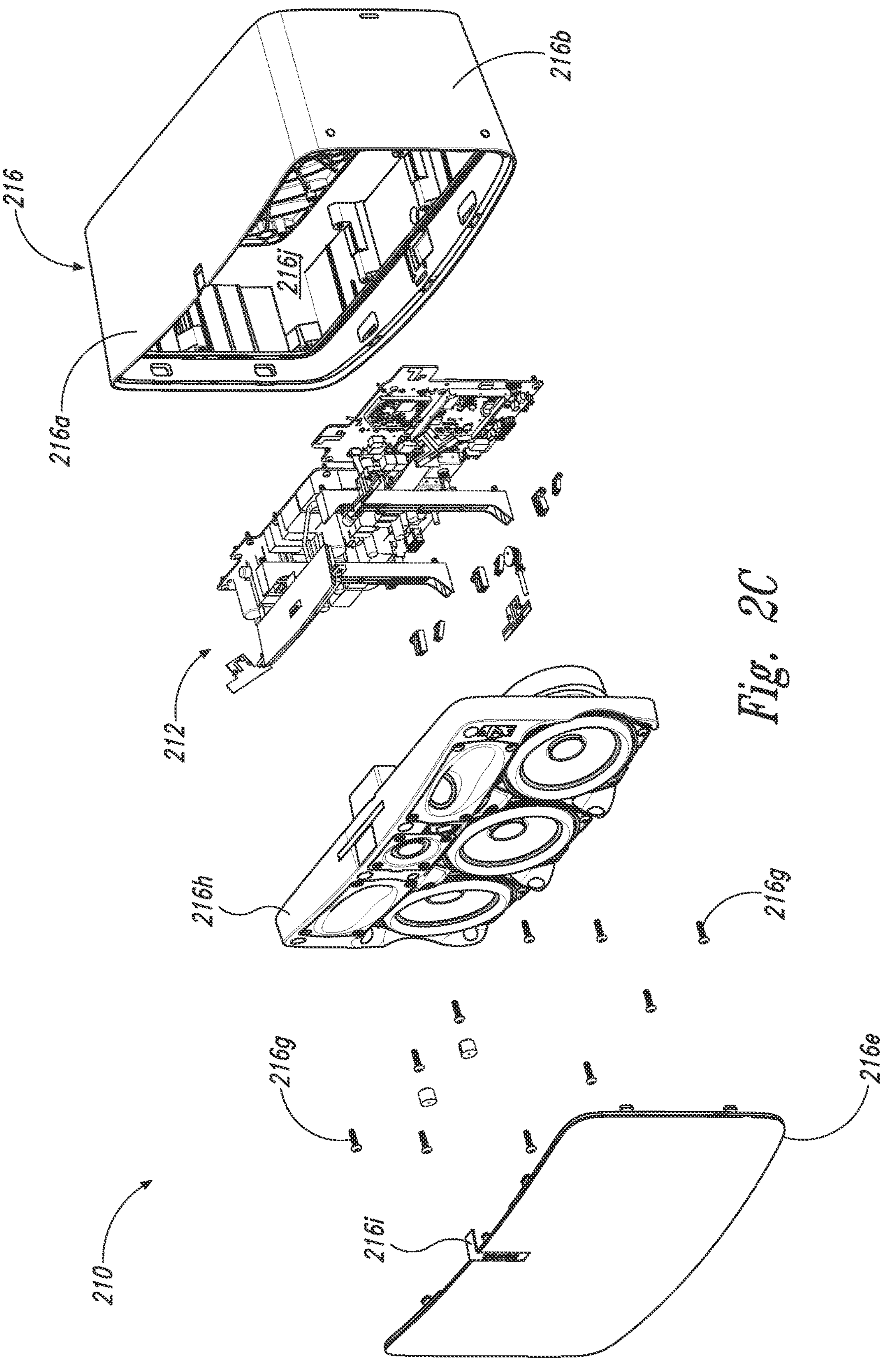
FIG. 2C is an exploded view of the playback device of FIG. 2A.

FIG. 2A is a front isometric view of a playback device 210 configured in accordance with embodiments of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f* A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some embodiments, however, the playback device 210 omits the filter 216*i*. In other embodiments, the playback device 210 includes one or more additional filters aligned with the transducers 214*b* and/or at least another of the transducers 214.

Figure 3:
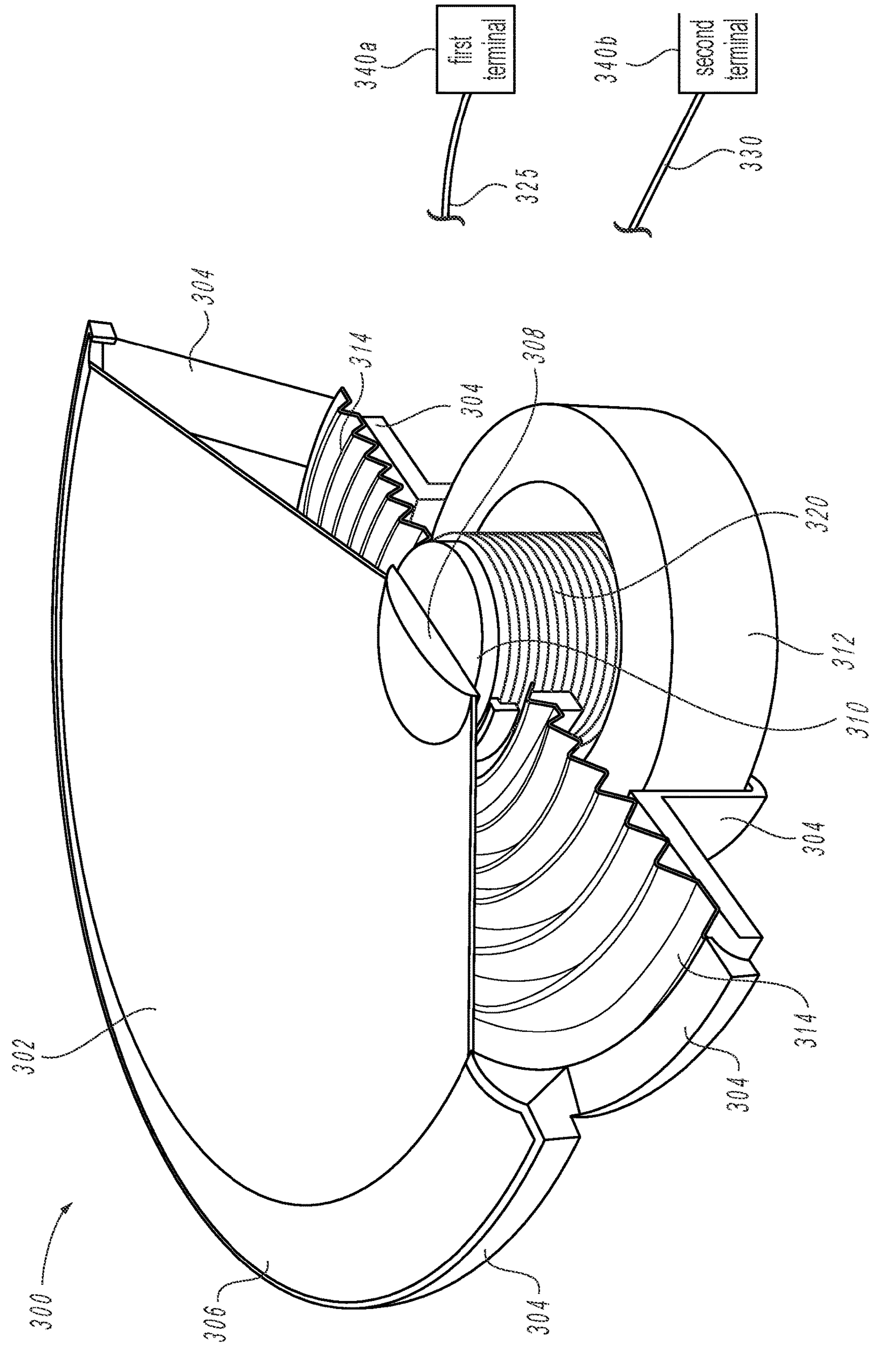
FIG. 3 is a partially schematic cutaway view of a transducer configured in accordance with embodiments of the disclosed technology.

FIG. 3 is a partially schematic cutaway view of a transducer 300 configured in accordance with embodiments of the disclosed technology. The transducer 300 can correspond to any one of the transducers 114, 214 described elsewhere herein. The transducer 300 can include standard audio device components, such as a diaphragm 302, a basket 304, a suspension 306 connecting the basket 304 to the diaphragm 302, a dust cap 308, a tubular member 310 (e.g., former or a plastic material), a voice coil 320 helically wound around the tubular member 310 and configured to move the diaphragm via a magnetic field, a magnet 312 disposed around the voice coil 320, and a spider 314 attached to the basket 304 and which maintains tension on the voice coil 320. As shown in FIG. 3, the basket 304 can be disposed around a periphery of the transducer 300 and generally support the other components of the transducer 300. The tubular member 310 may be disposed on and/or around a pole piece (not shown) which directs the magnetic field of the voice coil 320 to produce a desired audio. The transducer 300 can also include a first conductor 325 that electrically couples the voice coil 320 to a first terminal 340*a* (e.g., a negative terminal), and a second conductor 330 that electrically couples the voice coil 320 to a second terminal 340*b* (e.g., a positive terminal).

In some transducers, including those designed particularly for audio devices, the first conductor 325 connected to the first terminal 340*a* extends from a first end of the voice coil 320, and the second conductor 330 connected to the second terminal 340*b* extends from a second, opposing end of the voice coil 320. As explained elsewhere herein, disposing the first and second ends of the voice coil 320 at opposing sides of the voice coil 320 is often preferred for balance purposes. That is, disposing both ends of the voice coil 320 on the same side would cause the voice coil 320 to be unbalanced, e.g., due to the weight of (i) the first and second conductors 325, 330 connected to the voice coil 320, and/or (ii) the adhesive used to terminate the first and second conductors 325, 330 to the voice coil 320. This unbalance may result in the voice coil 320 tilting or otherwise becoming askew, thereby causing less desirable performance (e.g., audio output). Additionally, and as explained elsewhere herein, the first and second terminals 340*a-b* are preferably disposed adjacent one another, e.g., on the same side of the voice coil 320. For example, the first and second terminals 340*a-b* can be spaced apart from one another by less than approximately 15 degrees, 30 degrees, 60 degrees, 90 degrees, 120 degrees or 180 degrees, or any increment therebetween (e.g., 45 degrees) with respect to a center of the voice coil 320. If the first and second terminals 340*a-b* were separated from one another, the input leads connected to such terminals may effectively form an antenna and contribute noise and/or undesirable EMI signals. In view of the above, in some transducers, the first conductor 325 extends from the first side of the voice coil 320 to the first terminal 340*a* (also on the first side), and the second conductor 330 extends from the second, opposing side of the voice coil 320 to the second terminal, which is also disposed on the first side of the voice coil 320. In operation and as previously described, the second conductor 330 in such embodiments introduces EMI, which is generally undesirable for any transducer or corresponding audio device. For some devices, such EMI can be filtered downstream, e.g., via a filter incorporated with the amplifier. However, as devices continue to decrease in size, the ability to include downstream filters or shielding is more difficult.

As shown in FIG. 3, the first and second conductors 325, 330 are wires, which can be made from tinsel or any other suitable material(s) (e.g., material(s) having a relatively high mechanical flexibility). In some embodiments, the first and second conductors 325, 330 can include a conductive material such as tinsel, copper, lead, silver, or alloys thereof. Additionally or alternatively, at least a portion of the first and second conductors 325, 330 can be molded or formed into the basket 304 and/or baffle (not shown) of the transducer 300 or corresponding audio device. In such embodiments, the conductive material molded or formed into the basket 304 or baffle is electrically coupled to the voice coil 320. The first and second terminals 340*a-b* can be configured to electrically couple the voice coil 320 to an input source, such as wires from an amplifier (e.g., a filterless amplifier). In some embodiments, the first and second terminals 340*a-b* can be molded or formed into the basket 304 and/or baffle of the transducer 300 or corresponding audio device.

Figure 4:
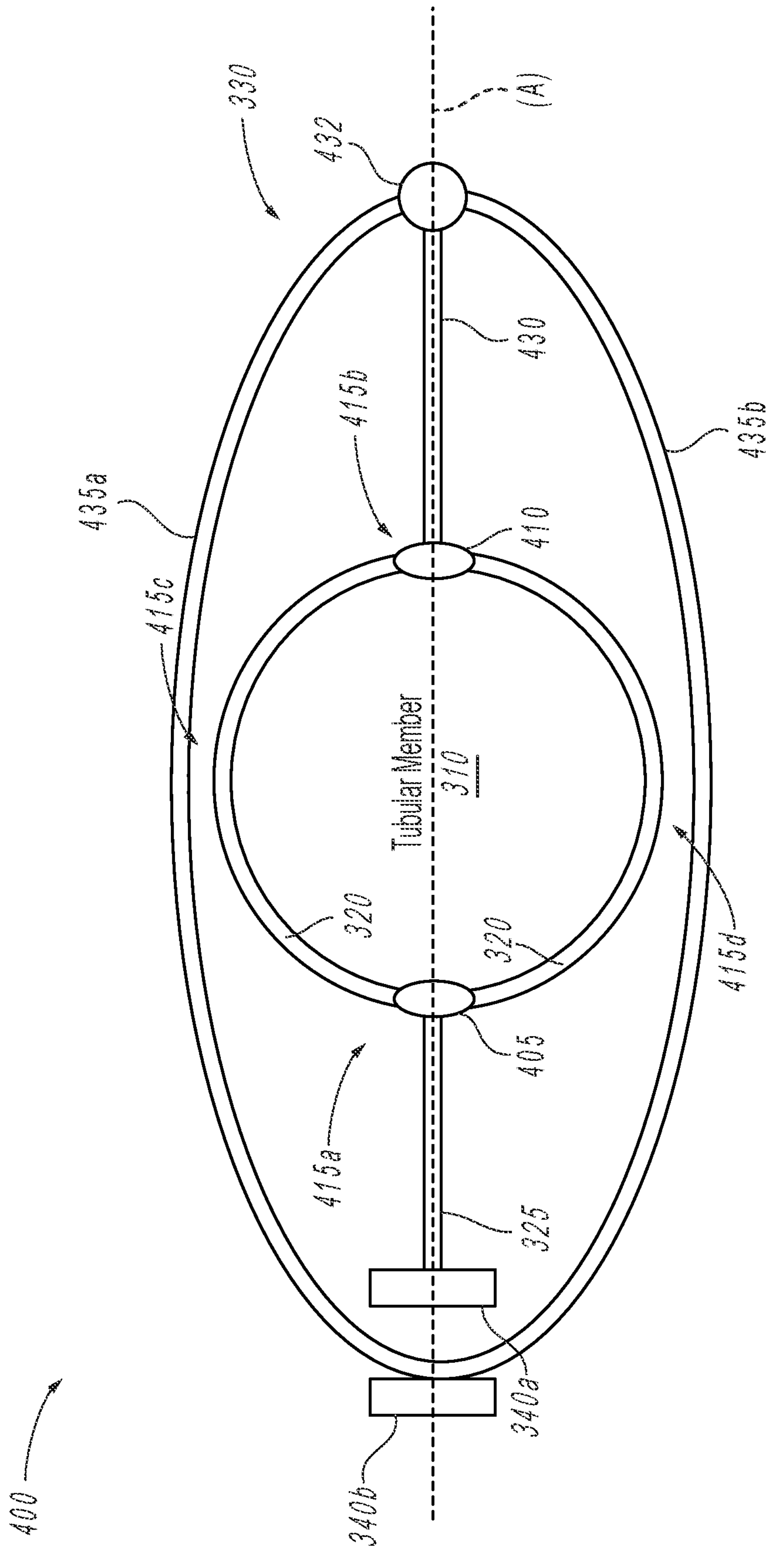
FIG. 4 is a partially schematic top-down view of a transducer configured in accordance with embodiments of the disclosed technology.

FIG. 4 is a partially schematic top-down view of a transducer 400 configured in accordance with embodiments of the disclosed technology. The transducer 400 may correspond to a portion of the transducer 300 (FIG. 3) previously described. As shown in FIG. 4, the transducer 400 includes the (i) voice coil 320 wrapped around the tubular member 310, (ii) the first conductor 325 connected to a first end 405 of the voice coil 320 and electrically coupling the voice coil 320 to the first terminal 340*a*, and (iii) the second conductor 330 connected to a second end 410 of the voice coil 320 and electrically coupling the voice coil 320 to the second terminal 340*b*. The first and second ends 405, 410 may be disposed on opposing sides 415*a*, 415*b* of the voice coil 320. Additionally or alternatively, the first and second conductors 325, 330 can extend from the voice coil 320 in substantially opposite directions relative to one another (e.g., between about 135 and 225 degrees from each other, between about 160 degrees and about 200 degrees from each other, and/or about 180 degrees from each other). That is, the first conductor 325 can extend in a first direction toward the first terminal 340*a* and the second conductor 330 can extend in a second, substantially opposite direction away from the first terminal 340*a* and/or voice coil 320. The first conductor 325 and the second conductor 330 or a portion thereof (e.g., the first portion 430, the second portion 435*a*, or the third portion 435*b*) can be disposed in the same of different vertical planes as one another. For example, when in different vertical plans from one another, the first conductor 325 may be above or below, and therein vertically spaced apart from, the second conductor 330 or a portion thereof.

The second conductor 330 can include multiple portions, including a first portion 430 extending from the voice coil 320 to a junction 432, a second portion 435*a* extending from the junction 432 to the second terminal 340*b*, and a third portion 435*b* extending from the junction 432 to the second terminal 340*b*. The second and third portions 435*a-b* can be substantially identical to one another in material, thickness, length, shape, and/or pathway, amongst other properties characteristics. The junction 432 can be a common point that couples (e.g., via soldering or fusing) the first, second, and third portions 430, 435*a*, 435*b* together. The second portion 435*a* can correspond to a first conductive pathway for directing or flowing current between the second terminal 340*b* and the voice coil 320, and the third portion 435*b* can correspond to a second conductive pathway for directing or flowing current between the second terminal 340*b* and the voice coil 320. The second portion 435*a* and first conductive pathway can be disposed on one side 415*c* of the voice coil 320, and the third portion 435*b* and second conductive pathway can be disposed on an opposing side 415*d* of the voice coil 320. In some embodiments, the second and third portions 435*a-b* are symmetric to one another about an axis (A). In such embodiments, the second and third portions may in operation flow a substantially equal amount of current therethrough, e.g., in the same direction. As shown in FIG. 4, the axis (A) can extend through one or more of: the first and second terminals 340*a-b*, the first conductor 325, the voice coil 320, and/or at least a portion (e.g., the first portion 430) of the second conductor 330. Additionally or alternatively, the second and third portions 435*a-b* can form an oval or elliptical shape (as opposed to a circular shape), which may be particularly suitable for portable and/or smaller devices (e.g., portable audio devices or speakers) having a more elongate configuration or dimension.

The first and second terminals 340*a-b* are disposed adjacent one another on the same side (e.g., the side 415*a*) of the voice coil 320. As described elsewhere herein, in some embodiments it is generally desirable to position the first and second terminals 340*a-b* adjacent one another such that the input leads connected to the terminals do not form an antenna and/or cause EMI or radiofrequency emissions therefrom. As such, there may be disadvantages to positioning the first and second terminals 340*a-b* on opposite sides (e.g., sides 415*a-b*) of the voice coil 320. As shown in FIG. 4, the first terminal 340*a* may be positioned peripheral to the second terminal 340*b* and horizontally further away from the voice coil 320. The second terminal 340*b* may be disposed on the same or different vertical plane than that of the first terminal 340*a*. When disposed in different vertical planes, the first and second terminals 340*a*-b may be disposed such that (i) one of the first and second terminals 340*a-b* is vertically over the other of the first and second terminals 340*a-b*, and/or (ii) the first and second terminals 340*a-b* are horizontally spaced apart from the voice coil 320 by an equal distance.

The first and second terminals 340*a-b*, the voice coil 320, and the first and second conductors 325, 330 form an electrical circuit. As noted previously, an input source can be electrically coupled to the first and second terminals 340*a-b*. In operation, the current can flow (i) from the second terminal 340*b* to the junction 432 via the second and third portions 435*a-b* (i.e., the first and second conductive pathways, respectively), (ii) from the junction 432 to the first end 410 via the first portion 430, (iii) from the first end 410 to the second end 405, and (iv) from the second end 405 to the first terminal 340*a* via the first conductor 325. In some embodiments, the current can flow in an opposite direction to that previously described. In such and other embodiments, current (e.g., a first current) can flow between the second terminal 340*b* and the junction 432 (via the second and third portions 435*a-b*) in a first general direction, and current (e.g., a second current) can flow between the junction 432 and the first terminal 340*a* (via the first portion 430, voice coil 320, and first conductor 325) in a second general direction that is opposite the first general direction. In doing so, the electromagnetic field produced via the first current can cancel (e.g., destructively interfere with) all or at least a portion of the electromagnetic field produced via the second current. That is, the electromagnetic field produced via the first current traveling from the second terminal 340*b* to the junction 432 via the second and third portions 435*a-b* can cancel or reduce all or at least a portion of the electromagnetic field produced via the second current traveling from the junction 432 to the first terminal 340*a* via the first portion 430, voice coil 320, and first conductor 325. In doing so, less or no EMI may be produced via the transducer 400 or corresponding audio device, relative to other transducers that do not include such an arrangement. Accordingly, embodiments of the disclosed technology address or at least mitigate the deficiencies of other transducers, in which EMI is introduced via one of the conductors extending along only one side of the voice coil. Reducing or eliminating the EMI can also remove the need to include downstream filters and/or shielding components, which would be needed with conventional transducers to reduce the EMI. Eliminating the need for downstream filtering and/or shielding can decrease manufacturing costs for the transducers and corresponding devices, and enable the devices to have a smaller footprint without sacrificing audio quality. In some embodiments, operating the transducer 300 with the second and third portions 435*a-b*, as described herein, can reduce emission of electromagnetic radiation by at least 5-10 decibels relative to other transducers that do not include the second and third portions 435*a-b*.-

Figure 5:
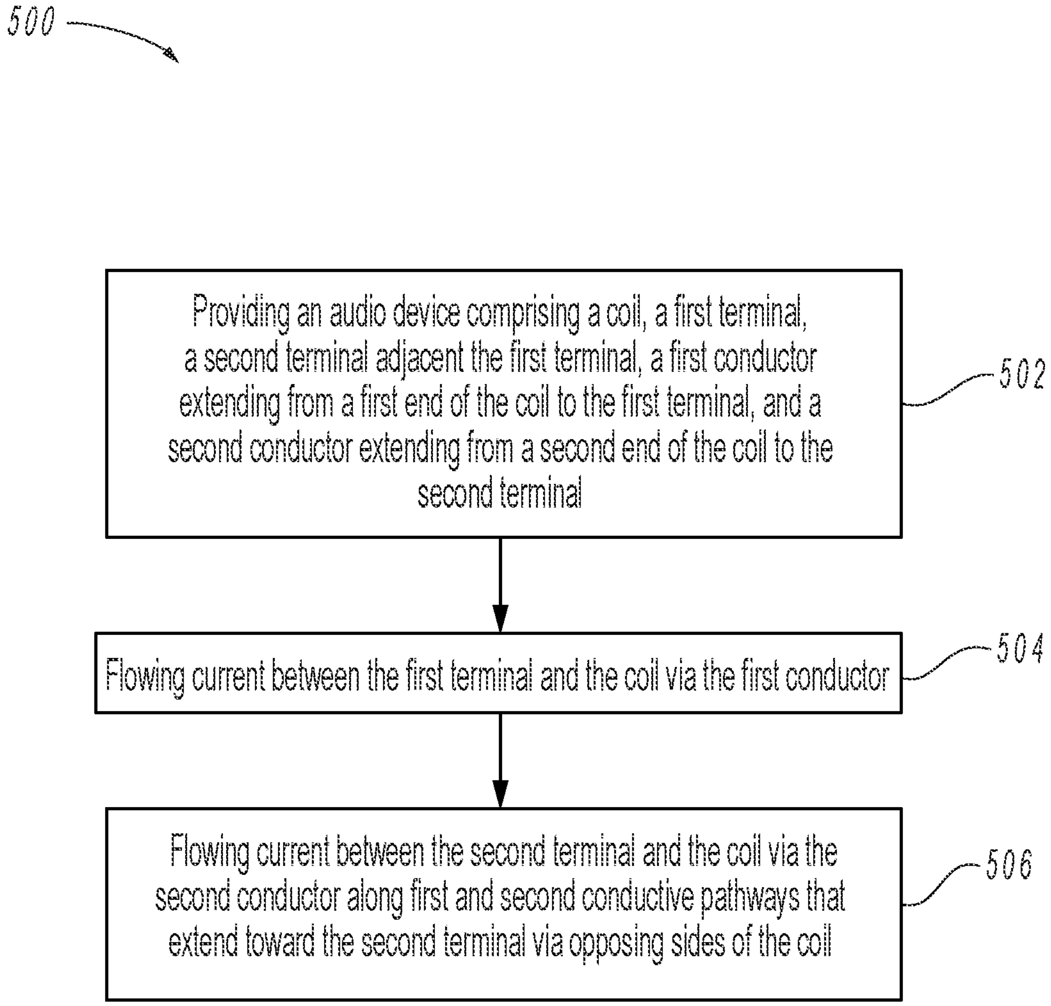
FIG. 5 is a flow diagram of a method of operating an audio device configured in accordance with embodiments of the disclosed technology.

FIG. 5 is a flow diagram of a method 500 of operating a transducer or audio device configured in accordance with embodiments of the disclosed technology. The method 500 can include providing a transducer (e.g., the transducer 300 or 400) or audio device comprising a coil (e.g. the voice coil 320), a first terminal (e.g., the first terminal 340*a*), a second terminal (e.g., the second terminal 340*b*) adjacent the first terminal, a first conductor (e.g., the first conductor 325) extending from a first end (e.g., the first end 405) of the voice coil to the first terminal, and a second conductor (e.g., the second conductor 330) extending from a second end (e.g., the second end 410) of the voice coil to the second terminal (process portion 502). The method 500 further comprises flowing current between the first terminal and the coil via the first conductor (process portion 504), and flowing current between the second terminal and the coil via the second conductor along first and second conductive pathways (e.g., the second and third portions 435*a-b*, respectively) that extend toward the second terminal via opposing sides of the coil (process portion 506). In some embodiments, the first and second conductive pathways may be symmetric or mirrored reflections of one another about an axis (e.g., the axis (A)) extending through the voice coil and/or the portion of the second conductor extending directly from the voice coil. Additionally or alternatively, in some embodiments flowing current between the second terminal and the coil can include (i) flowing a first current between the second terminal and the coil via the first conductive pathway, and (ii) flowing a second current, equal in magnitude to the first current, between the second terminal and the coil via the second conductive pathway. The first current flowing through the first conductive pathway may generate a first electromagnetic field having a substantially equal magnitude to that of a second electromagnetic field generated by the second current flowing through the second conductive pathway.

In some embodiments, current can flow (i) from the second terminal to the junction via the second and third portions (i.e., the first and second conductive pathways, respectively), (ii) from the junction to the first end via the first portion, (iii) from the first end to the second end, and (iv) from the second end to the first terminal via the first conductor. In some embodiments, the current can flow in an opposite direction to that previously described. In such and other embodiments, current (e.g., a first current) can flow between the second terminal and the junction (via the second and third portions) in a first general direction, and current (e.g., a second current) can flow between the junction and the first terminal (via the first portion, voice coil, and first conductor) in a second general direction that is opposite the first general direction. In doing so, the electromagnetic field (e.g., a first electromagnetic field) produced via the first current can cancel (e.g., destructively interfere with) all or at least a portion of the electromagnetic field (e.g., a second electromagnetic field) produced via the second current. Stated differently, the first electromagnetic field effectively can cancel out all or at least a portion of the second electromagnetic field such that no or a limited amount of EMI is produced via the transducer and/or audio device. Operating the transducer and/or audio device in such a manner can result in better sound quality for a listener, and reduce emission of electromagnetic radiation from the transducer and/or audio device. Reducing such emissions can help ensure the corresponding device is below the relevant national, regional and/or international standards electromagnetic radiation. As described elsewhere herein, operating the transducer and/or audio device with the first and second conductive pathways described herein can reduce emission of electromagnetic radiation by at least 5-10 decibels relative to other conventional transducers and audio devices that do not include the first and second conductive pathways.

Figure 6:
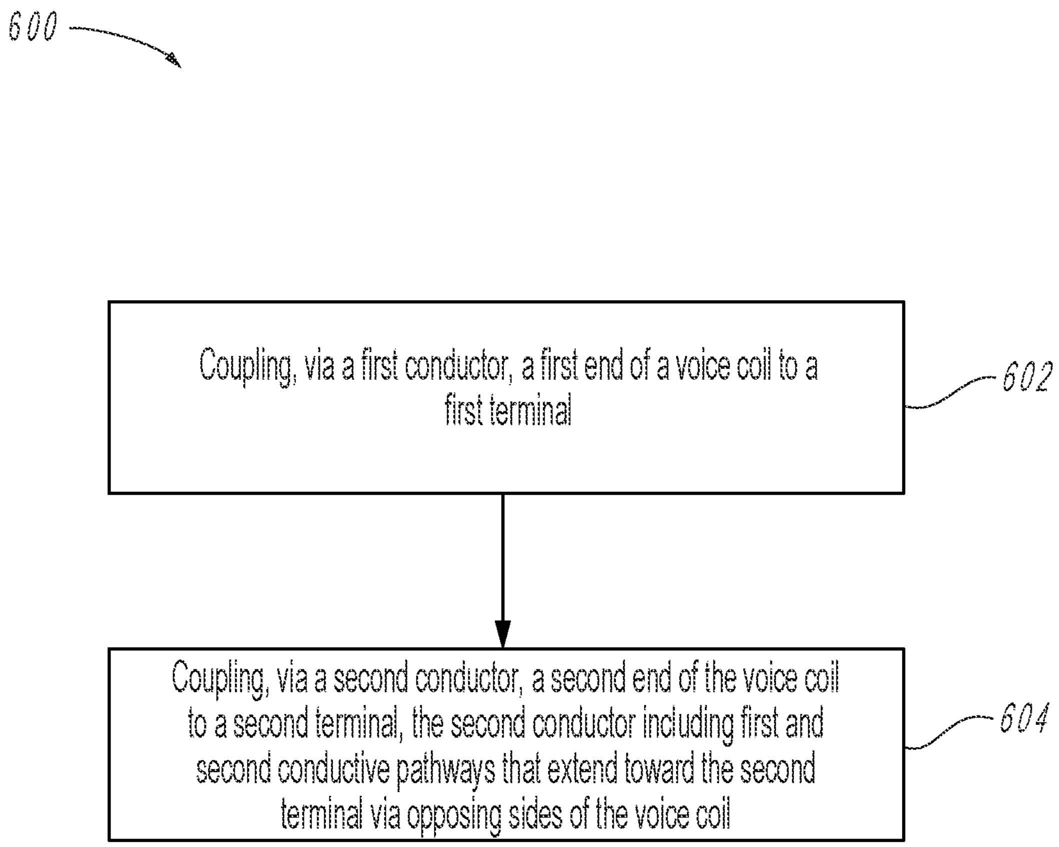
FIG. 6 is a flow diagram of a method of manufacturing a transducer of an audio device configured in accordance with embodiments of the disclosed technology.

FIG. 6 is a flow diagram of a method 600 of manufacturing a transducer of an audio device configured in accordance with embodiments of the disclosed technology. The method 600 can include coupling, via a first conductor (e.g., the first conductor 325), a first end (e.g., the first end 405) of a voice coil (e.g. the voice coil 320) to a first terminal (e.g., the first terminal 340*a*) (process portion 602), and coupling, via a second conductor (e.g., the second conductor 330), a second end (e.g., the second end 410) of the voice coil to a second terminal (e.g., the second terminal 340*b*), the second conductor including first and second conductive pathways (e.g., the second and third portions 435*a-b*, respectively) that extend toward the second terminal via opposing sides of the coil (process portion 604). In some embodiments, the ends of the voice coil can be coupled to the respective terminals using conductive members such as wires or other suitable conductors. In some embodiments, such conductive members can be molded or formed into other components of the transducer (e.g., molded or formed into a basket or baffle of the transducer).

IV. Conclusion

The above discussions relating to playback devices, controller devices, playback zone configurations, and media content sources provide only some examples of operating environments within which functions and methods described below may be implemented. Other operating environments and/or configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software embodiments or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring embodiments of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The disclosed technology is illustrated, for example, according to various embodiments described below. Various examples of embodiments of the disclosed technology are described as numbered examples (1, 2, 3, etc.) for convenience. These are provided as examples and do not limit the disclosed technology. It is noted that any of the dependent examples may be combined in any combination, and placed into a respective independent example. The other examples can be presented in a similar manner.

Clause 1: An audio device, comprising: a coil having a first side, a first end disposed on the first side, a second side substantially opposite the first side, and a second end disposed on the second side; a first terminal disposed adjacent the first side of the coil; a second terminal disposed adjacent the first side of the coil; a first conductor extending from the first end of the coil to the first terminal; and a second conductor extending from the second end of the coil to the second terminal, the second conductor including a first conductive pathway and a second conductive pathway spaced apart from the first conductive pathway such that the coil is disposed between the first conductive pathway and the second conductive pathway.

Clause 2: The audio device of any one of the previous clauses, wherein at least a portion of the first conductive pathway is symmetric to the second conductive pathway about an axis extending from the first side through the coil to the second side.

Clause 3: The audio device of any one of the previous clauses, wherein the axis extends through a portion of the first conductor extending from the coil to the first terminal.

Clause 4: The audio device of any one of the previous clauses, wherein the first conductor extends from the coil in a first direction away from the first side and at least a portion of the second conductor extends from the coil in a second direction substantially opposite the first direction.

Clause 5: The audio device of any one of the previous clauses, wherein the first and second conductors are wires.

Clause 6: The audio device of any one of the previous clauses, wherein at least a portion of the second conductor is molded or formed into a basket and/or a baffle of the audio device.

Clause 7: The audio device of any one of the previous clauses, further comprising a filterless amplifier in electrical communication with the first and second terminals.

Clause 8: The audio device of any one of the previous clauses, wherein the first and second conductive pathways are operably configured to carry a substantially equal amount of current.

Clause 9: The audio device of any one of the previous clauses, wherein the first and second conductive pathways are configured to produce a first electromagnetic effect, and wherein the first conductor, the voice coil, and a portion of the second conductor extending from the second end are configured to produce a second electromagnetic effect opposite in polarity to the first electromagnetic effect.

Clause 10: A transducer, comprising: a first terminal; a second terminal; a voice coil including a first end and a second end substantially opposite the first end; a first conductor extending from the voice coil at the first end, the first conductor being electrically coupled to the first terminal; and a second conductor extending from the voice coil at the second end, the second conductor (i) being electrically coupled to the second terminal and (ii) including a first conductive pathway and a second conductive pathway spaced apart from the first conductive pathway, wherein the first and second conductive pathways extend toward the first end via opposing sides of the voice coil.

Clause 11: The transducer of any one of the previous clauses, wherein the first conductive pathway is operably configured to produce a first electromagnetic field, and wherein the second conductive pathway is operably configured to produce a second electromagnetic field substantially equal in magnitude to the first electromagnetic field.

Clause 12: The transducer of any one of the previous clauses, wherein at least a portion of the first conductive pathway is a mirrored reflection of the second conductive pathway about an axis extending from the first end through the voice coil.

Clause 13: The transducer of any one of the previous clauses, wherein at least a portion of the first conductive pathway is a mirrored reflection of the second conductive pathway about an axis extending through the first conductor.

Clause 14: The transducer of any one of the previous clauses, wherein the first and second terminals are proximate one another and positioned along the axis.

Clause 15: The transducer of any one of the previous clauses, wherein the first conductor extends from the voice coil in a first direction toward the first terminal, and wherein at least a portion of the second conductor extends from the voice coil in a second direction opposite the first direction.

Clause 16: The transducer of any one of the previous clauses, wherein the first conductor, second conductor, first conductive pathway, and second conductive pathway comprise wires.

Clause 17: A method of operating an audio device, comprising: providing an audio device comprising a coil, a first terminal, a second terminal adjacent the first terminal, a first conductor extending from a first end of the coil to the first terminal, and a second conductor extending from a second end of the coil to the second terminal; flowing current from the first terminal to the coil via the first conductor; and flowing current from the second terminal to the coil via the second conductor along first and second conductive pathways that extend toward the second terminal via opposing sides of the coil.

Clause 18: The method of any one of the previous clauses, wherein flowing current from the second terminal comprises (i) flowing a first current in a first direction from the second terminal to the coil via the first and second conductive pathways, and (ii) flowing a second current in a second direction between the first terminal and the coil.

Clause 19: The method of any one of the previous clauses, wherein flowing the first current produces a first electromagnetic field having a first polarity, and wherein flowing the second current produces a second electromagnetic field having a second polarity opposite the first polarity.

Clause 20: The method of any one of the previous clauses, wherein the axis extends through a portion of the first conductor extending from the coil to the first terminal.

Clause 21: A method of manufacturing an audio device, comprising: coupling, via a first conductor, a first end of a voice coil to a first terminal; and coupling, via a second conductor, a second end of the voice coil to a second terminal, the second conductor including first and second conductive pathways that extend toward the second terminal via opposing sides of the voice coil.

Clause 22: The method of any one of the previous clauses, wherein the audio device is that of any one of the previous Clauses.

Clause 23: An audio signal processing system of a playback device, the system comprising the audio device or transducer of any one of the previous clauses; a processor; tangible, non-transitory, computer-readable media storing instructions executable by the processor.

Clause 24: A network microphone device comprising one or more microphones configured to detect sound, the audio device or transducer of any one of the previous clauses; one or more processors; tangible, non-transitory, computer-readable media storing instructions executable by the one or more processors.

Clause 25: A playback device comprising a speaker; a processor; and a tangible, non-transitory computer-readable medium storing instructions executable by the processor, the speaker comprising the transducer of any one of the previous clauses.

The invention claimed is:

1. A transducer assembly, comprising:
- a coil having:
  - a first side,
  - a second side substantially opposite the first side,
  - a first terminal disposed adjacent the first side of the coil;
  - a second terminal disposed adjacent the first side of the coil;
  - a first conductor extending from the first side of the coil to the first terminal; and
  - a second conductor extending from the second side of the coil to the second terminal, the second conductor including:
    - a first wire; and
    - a second wire spaced apart from the first wire such that the coil is disposed between the first wire and the second wire, wherein the first and second wire are operably configured to carry a substantially equal amount of current.

2. The transducer assembly of claim 1, wherein at least a portion of the first wire is symmetric to the second wire about an axis (A) extending from the first side through the coil to the second side.

3. The transducer assembly of claim 2, wherein the axis (A) extends through a portion of the first conductor extending from the coil to the first terminal.

4. The transducer assembly of claim 1, wherein:
- the first conductor extends from the coil in a first direction away from the first side; and
- at least a portion of the second conductor extends from the coil in a second direction substantially opposite the first direction.

5. The transducer assembly of claim 1, wherein the first and second conductors are wires.

6. The transducer assembly of claim 1, wherein at least a portion of the second conductor is molded or formed into a basket and/or a baffle of the audio device.

7. The transducer assembly of claim 1, further comprising a filterless amplifier in electrical communication with the first and second terminals.

8. The transducer assembly of claim 1, wherein the first wire is operably configured to produce a first electromagnetic field, and wherein the second wire is operably configured to produce a second electromagnetic field substantially equal in magnitude to the first electromagnetic field.

9. The transducer assembly of claim 1, wherein:
- the first and second wires are configured to produce a first electromagnetic effect; and
- the first conductor, the voice coil, and a portion of the second conductor extending from the second side of the voice coil are configured to produce a second electromagnetic effect opposite in polarity to the first electromagnetic effect.

10. The transducer assembly of claim 1, wherein the first and second conductors are electrically coupled to the first and second terminals, respectively.

11. The transducer assembly of claim 1, wherein the first and second wires extend toward the second terminal via opposing sides of the voice coil.

12. The transducer assembly of claim 1, wherein at least a portion of the first wire is a mirrored reflection of the second wire about an axis extending from the first side through the voice coil.

13. The transducer assembly of claim 1, wherein at least a portion of the first wire is a mirrored reflection of the second wire about an axis extending through the first conductor.

14. The transducer assembly of claim 1, wherein the first and second terminals are proximate one another and positioned along the axis.

15. The transducer assembly of claim 1, wherein the first conductor extends from the voice coil in a first direction toward the first terminal, and wherein at least a portion of the second conductor extends from the voice coil in a second direction opposite the first direction.

16. The transducer assembly of claim 1, wherein the first conductor and the second conductor comprise wires.

17. A method for an audio device comprising a coil, a first terminal, a second terminal adjacent the first terminal, a first conductor extending from a first side of the coil to the first terminal, and a second conductor extending from a second side of the coil to the second terminal, the method comprising:
- flowing current between the first terminal and the coil via the first conductor; and
- flowing current between the second terminal and the coil via the second conductor along first and second wires that extend toward the second terminal via opposing sides of the coil such that the first and second wires carry a substantially equal amount of current.

18. The method of claim 17, wherein flowing current between the second terminal and the coil comprises (i) flowing a first current in a first direction between the second terminal and the coil via the first and second wires, and (ii) flowing a second current in a second direction between the first terminal and the coil.

19. The method of claim 17, wherein:

flowing the first current produces a first electromagnetic field having a first polarity; and flowing the second current produces a second electromagnetic field having a second polarity opposite the first polarity.

20. The method of claim 17, wherein at least a portion of the first wire is symmetric to the second wire about an axis extending through a portion of the first conductor and the second conductor.

* * * * *